Sept. 13, 1932.    G. K. O'CONNOR    1,877,576
MULTIPLE QUANTITY REGULATION
Filed May 14, 1931    4 Sheets-Sheet 1
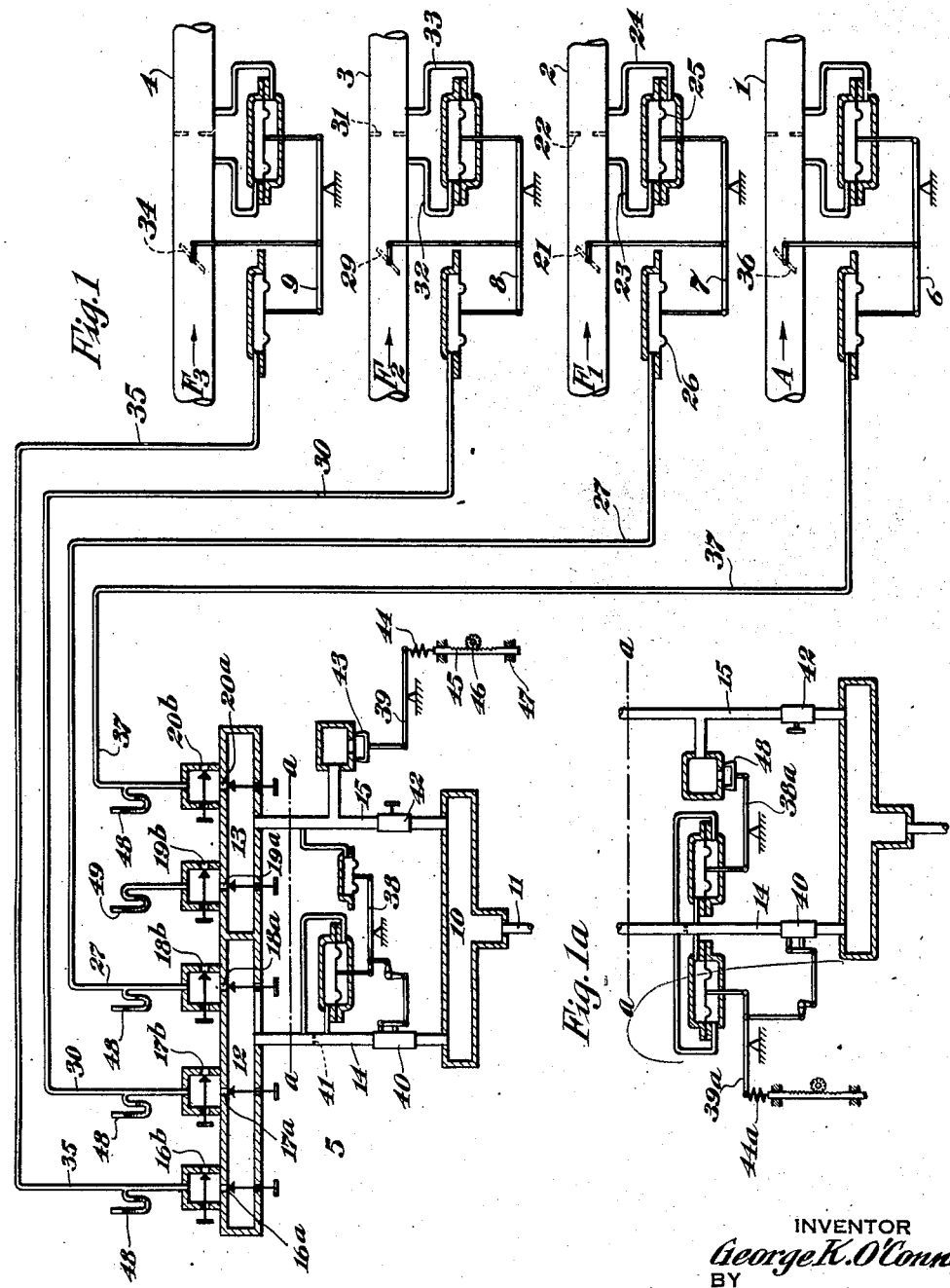
INVENTOR
George K. O'Connor
BY
Bartlett, Eyre, Scott & Keel
ATTORNEYS

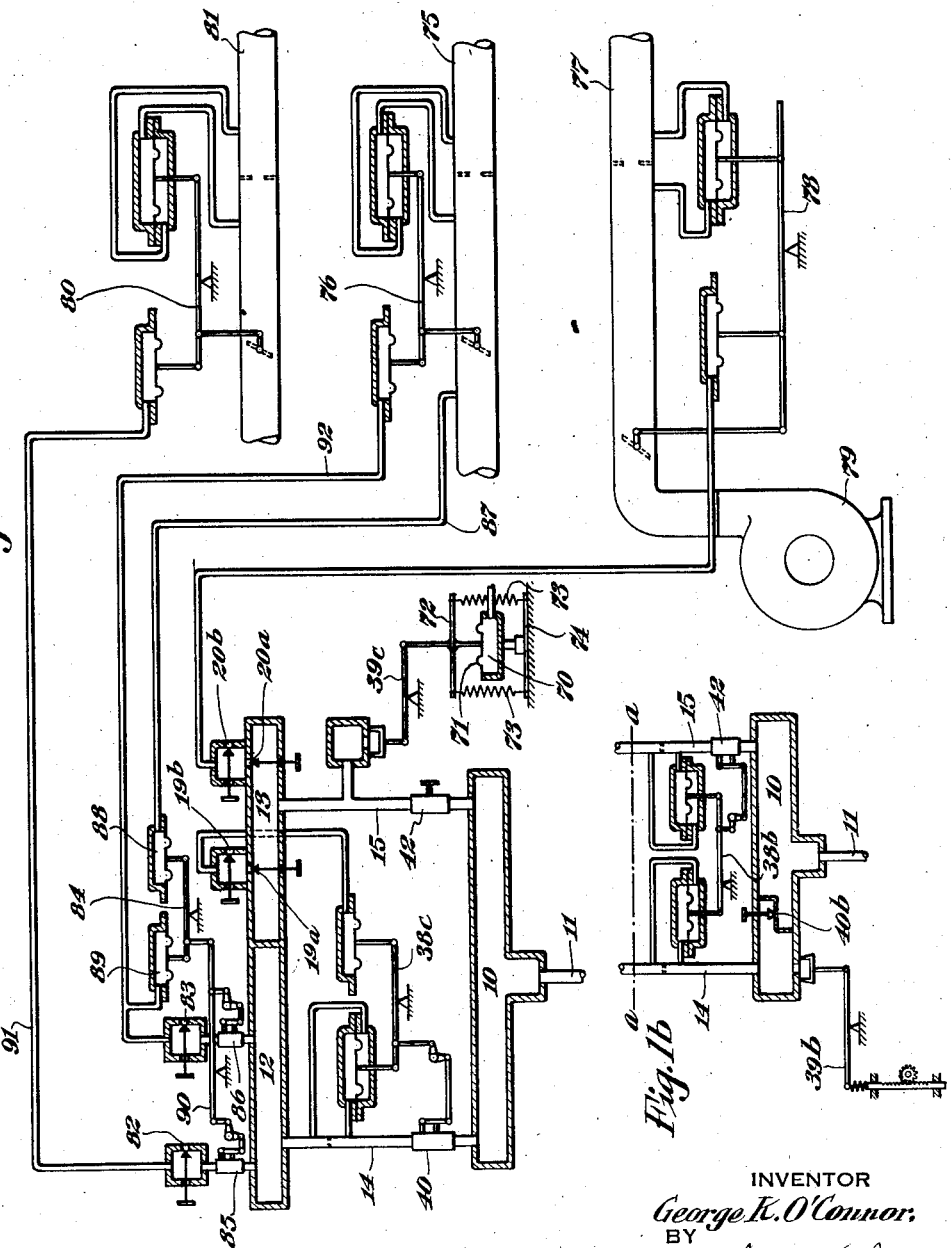

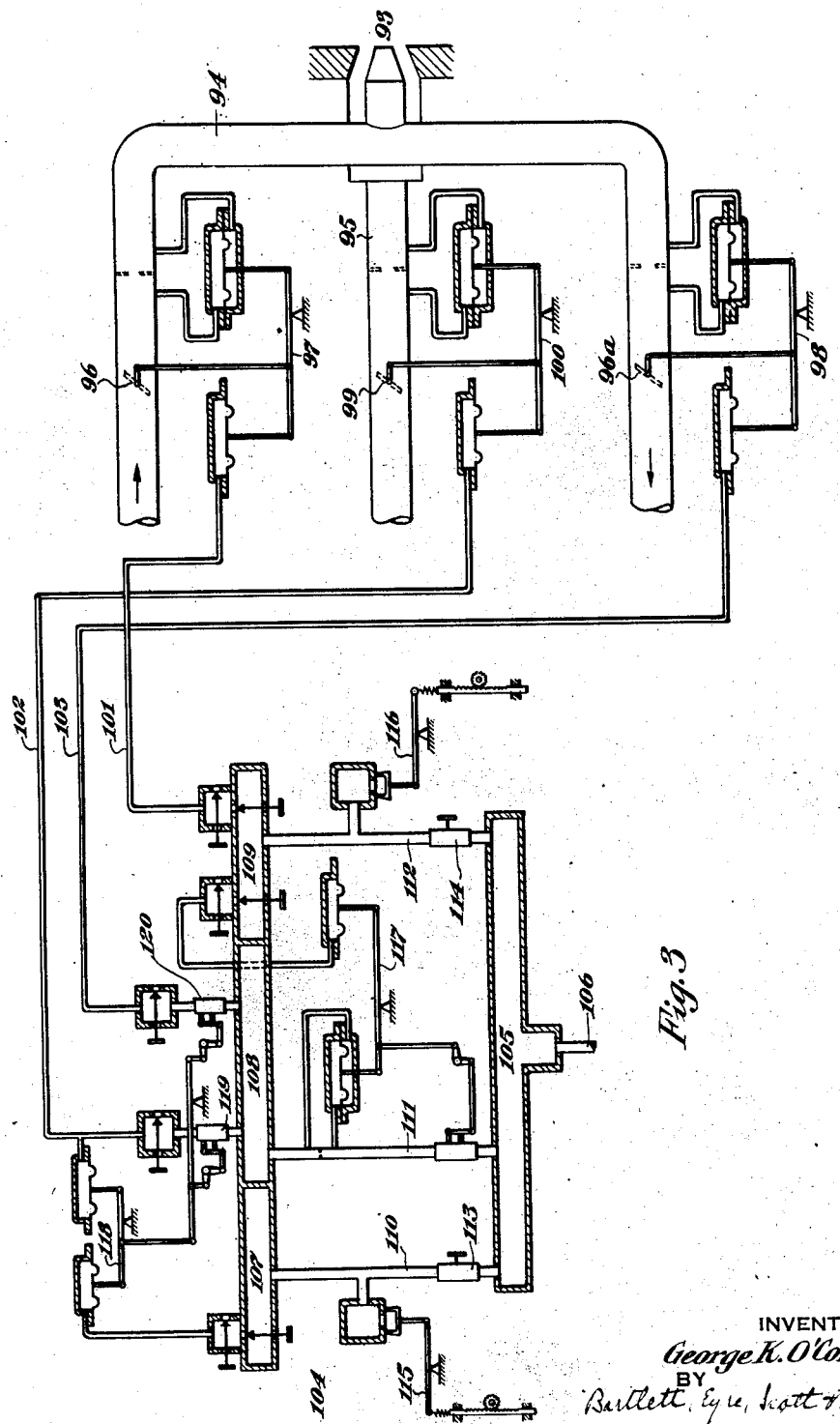

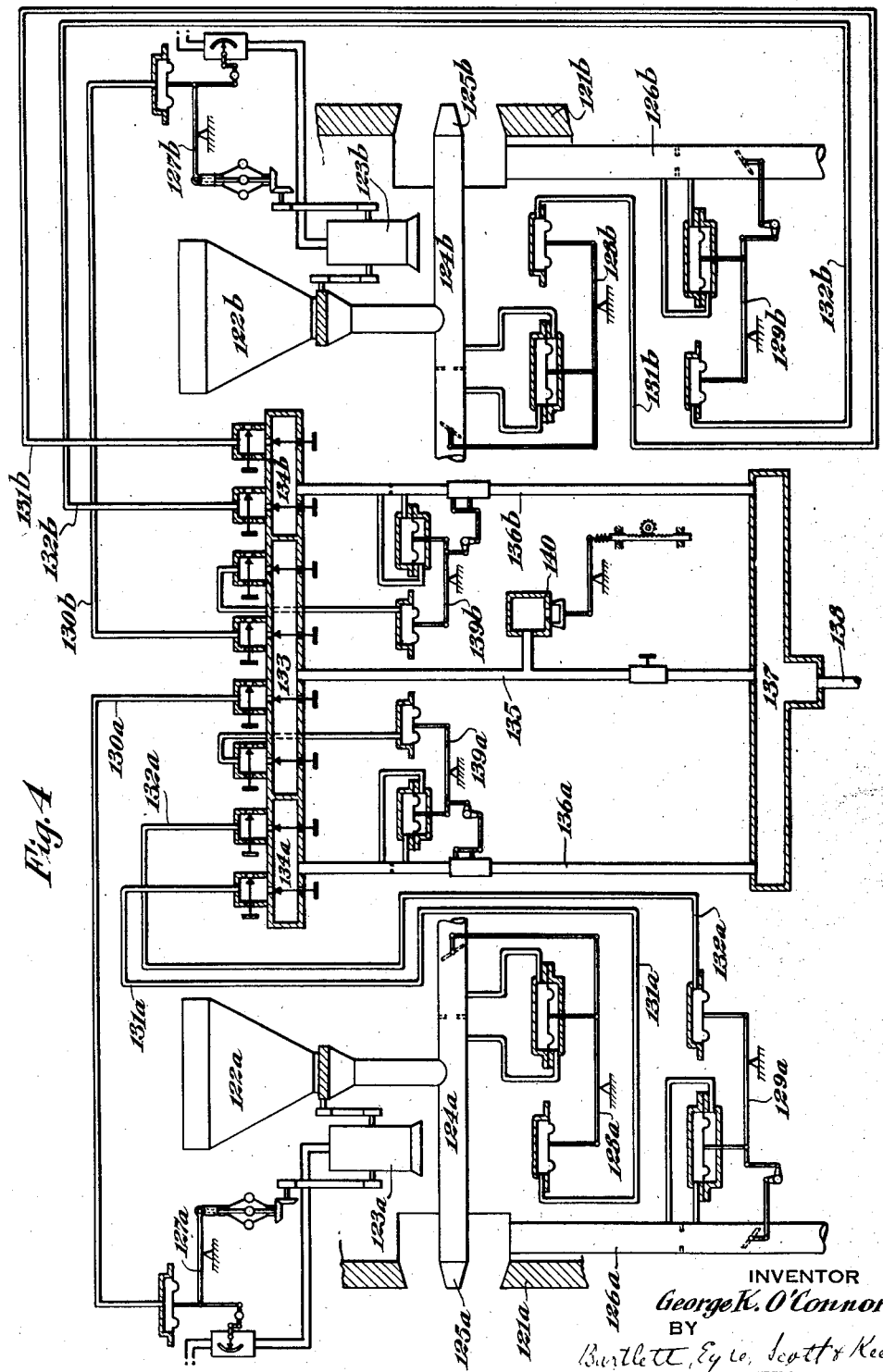

Patented Sept. 13, 1932

1,877,576

UNITED STATES PATENT OFFICE

GEORGE K. O'CONNOR, OF FAIRLAWN, NEW JERSEY, ASSIGNOR TO SMOOT ENGINEERING CORPORATION, OF NEW YORK, N. Y., A CORPORATION OF DELAWARE

MULTIPLE QUANTITY REGULATION

Application filed May 14, 1931. Serial No. 537,336.

My invention relates to the art of regulation and comprises a novel method of regulating a plurality of quantities to maintain the sum or difference of a number of quantities in accurate proportion to the sum or difference of a number of other quantities. My invention comprises also an improved master controller constructed to carry out my method of regulation and adapted to form, with various individual regulators, a wide variety of combinations for the remote control of quantities. My master controller is so constructed as to permit of a wide range of adjustment to vary the individual quantities controlled thereby, to vary the ratio between one or more of them while maintaining their sum constant or to vary all quantities simultaneously without changing desired ratios.

The invention in its broadest aspects is directed to the regulation of quantities of the flow type, that is, to quantities which are ordinarily measured by forces varying as the square thereof. It comprises the creation and control of a master flow and the division of this master flow into a plurality of component flows, each controlling one of a plurality of quantities so as to maintain the sum of the quantities in proportion to the master flow or to any other quantity or quantities proportioned thereto, that is, so as to maintain the sum of values varying linearly with the square roots of the forces measuring the quantities equal to any desired value constant or varying. The invention is particularly adapted to the control of a plurality of fluid flows and, being best understood with reference to such use, it will be so described, it being understood that the specific applications described are illustrative of the method and are not to be considered as limiting the scope of the invention.

The fact that flow regulation involves flow measurement and such measurement is that of pressure differentials which vary as the square of the flow and not linearly therewith has heretofore introduced inaccuracies into the regulation whenever a plurality of flows were to be regulated. For example, if it is desired to proportion one flow to the sum of two other flows, the proportioning of the pressure differential measuring the one flow to the sum of the pressure differentials measuring the other two flows does not give the desired proportionality but merely proportions the root mean square of the two flows to the first flow. Expressed mathematically if $F_1$, $F_2$ and $F_3$ are the flows to be regulated, and $k$ is a constant, the desired ratio is:

(1) $F_1 = k(F_2 + F_3)$ whereas the direct method of proportioning the pressure differentials would give (2) $F_1 = k\sqrt{F_2^2 + F_3^2}$ In many cases it is preferred to maintain one flow in proportion to the sum of linear functions of two or more other flows rather than to the actual sum of the flows. For example, when a furnace is supplied with two or more different fuels and with one air supply for burning the fuels, the total flow of air should be maintained equal to the sum of the air requirements for each fuel rather than proportional to the sum of the fuel flows. Expressed mathematically the desired relation in this case would be (3) $F_1 = k_2 F_2 + k_3 F_3$ where $F_1$ represents the total air flow, $F_2$ and $F_3$ the fuel flows and $k_2$ and $k_3$ constants indicative of the air requirements for each fuel.

If Equation (3) is expressed in terms of the pressure differentials $P_1$, $P_2$ and $P_3$ measuring the flows $F_1$, $F_2$ and $F_3$ respectively, it becomes:

(4) $\sqrt{P_1} = k_2 \sqrt{P_2} + k_3 \sqrt{P_3}$

Heretofore no satisfactory method or apparatus has been available for automatically maintaining a ratio of the type expressed by Equation (4), of which Equation (1) is a special case (when the constants are equal).

To a limited extent such a ratio has been obtained by subdividing the one flow into components, each of which is then maintained in proportion to one of the other flows. Such an arrangement is not always feasible, is never sufficiently flexible, requires many regulators and necessitates constructional changes to obtain the component flows.

The method which I employ has none of the disadvantages above outlined. It comprises, broadly, the creation of two proportional master flows of an auxiliary fluid, the division of these flows into any desired number of component flows and the control of the flows to be regulated by pressure differentials measuring the component master flows.

This method insures that the sum of linear functions of the flows controlled by the components of one master flow will be proportional to the sum of the linear functions of the flows controlled by the components of the other master flow and that, therefore, by suitable selection of controlling component flows, one flow may be maintained in proportion to the sum or to the difference of two other flows, ratios between two or more flows may be varied with or without variation of their sum as desired, and all flows may be varied together or separately as desired.

Of the accompanying drawings, in which various specific applications of the invention to the control of fuel and air to furnaces, are illustrated.

Fig. 1 shows a master controller arranged for the maintenance of one flow, for example air, equal to the sum of linear functions of three flows, for example to the sum of the air requirements of three different fuels.

Figs. 1a and 1b are fragmentary views illustrating different methods of maintaining the two master flows of Fig. 1 in proportion;

Fig. 2 shows the master controller of Fig. 1 arranged for the control of basic and make-up fuels and of the air therefor; the regulation of the make-up fuel depending upon the supply of basic fuel available and the flow of air being kept equal to the sum of the air requirements of the two fuels;

Fig. 3 illustrates a modified form of master controller arranged for the control of a return oil burner system;

Fig. 4 illustrates a modified form of master controller particularly adapted for the control of several furnaces or for the control of two or more flows to maintain their sum proportional to the sum of two or more other flows.

In Fig. 1 is illustrated apparatus for maintaining a flow A, through a conduit 1 proportional to the sum of linear functions of the flows $F_1$, $F_2$ and $F_3$ through conduits 2, 3 and 4 respectively. If the flows $F_1$, $F_2$ and $F_3$ are different fuel flows, and the flow A the total air for burning the fuels, then the apparatus is adapted to maintain flow A equal to the sum of the air requirements of the fuels. The apparatus includes a master controller 5 and regulators 6, 7, 8 and 9 associated respectively with conduits 1, 2, 3 and 4 for the control of the flows therethrough. The master controller 5 includes a chamber 10 to which auxiliary master pressure fluid is supplied from any suitable source (not shown) by a conduit 11 and two chambers 12 and 13 to which the master fluid is delivered from chamber 10 by conduits 14 and 15 respectively. From chamber 12, the master fluid flows to the atmosphere through three pair of valve controlled orifices, 16a, 16b, 17a, 17b and 18a, 18b in parallel and from chamber 13 the master fluid flows to the atmosphere through two pair of valve controlled orifices 19a, 19b and 20a, 20b.

The master fluid flow through conduit 14 is thus divided into three component master flows and the master flow through conduit 15 is divided into two component flows.

The fluid pressure intermediate orifices 16a and 16b varies as the square of the component master flow through this pair of orifices. Similarly the fluid pressures intermediate orifices 17a and 17b and intermediate orifices 18a and 18b vary as the squares of the component flows through these orifices. Regulator 7, diagrammatically indicated as a balancing lever, controls the position of a damper 21 to maintain the pressure differential across a constriction 22 in conduit 2 as measured by pipes 23 and 24 and transmitted thereby to opposite sides of a diaphragm 25 in proportion to the pressure intermediate orifices 18a and 18b as transmitted to one side of a diaphragm 26 by a control pipe 27; diaphragms 25 and 26 being connected to the lever 7 at opposite sides of the pivot. This arrangement maintains the flow $F_1$ in proportion to the master component flow through orifices 18a and 18b. Similarly a damper 29 in conduit 3 is controlled by regulator 8, to maintain the flow $F_2$ in proportion to the component flow through orifices 17a and 17b, by a balance between the master pressure intermediate these orifices as transmitted by a pipe 30 to the regulator and the pressure differential across a restriction 31 in conduit 3 as transmitted by pipes 32 and 33 to the regulator, and a damper 34 in conduit 4 is controlled by regulator 9 to maintain the flow $F_3$ in proportion ot the component flow through orifices 16a and 16b by a balance between the pressure differential measuring the flow $F_3$ and the pressure in pipe 35 connected intermediate orifices 16a and 16b measuring the component flow therethrough.

In like manner regulator 6 maintains the flow A in proportion to the component master flow through orifices 20a and 20b by adjustment of a damper 36 in conduit 1 in response to a balance between the pressure differential measuring flow A and the pressure in pipe 37 connected intermediate orifices 20a and 20b to measure the flow therethrough.

The above described arrangement maintains the sum of values varying linearly with the flows $F_1$, $F_2$ and $F_3$ in proportion to the master flow through conduit 14 for each of the component master flows from chamber 12 is maintained in proportion to one of the flows $F_1$, $F_2$ and $F_3$ and the sum of these component flows is always equal to the master flow through conduit 14.

To obtain, therefore, the desired relation between the flow A and the flows $F_1$, $F_2$ and $F_3$ it is only necessary to maintain the master flow through conduit 14 in proportion to the component flow through orifices 20a and 20b. To permit adjustment of all of the flows together at the master, additional means for adjusting one of the master flows is provided.

In Figs. 1, 1a and 1b three different means for obtaining these results are illustrated. In Fig. 1 these means comprise devices 38 and 39. Device 38, indicated diagrammatically as a pivoted lever arranged to control a throttle valve 40 in conduit 14, maintains the master flow through conduit 14, as measured by the pressures at either side of a constriction 41 in proportion to the pressure in conduit 15 beyond a throttle valve 42 therein and thus in proportion to the component flow through orifices 20a and 20b which varies directly with the pressure in conduit 15.

Device 39 comprises a pivoted lever carrying at one end a cup valve 43 permitting leakage of master fluid from conduit 15 and at the other end a spring 44 the tension of which opposes on lever 39 the pressure acting upon the cup valve 43. Adjustment of the tension of spring 44 thus causes cup valve 43 to vary the leakage of master fluid until the pressure acting upon the cup valve is in equilibrium with the adjusted tension of the spring. Adjustment of spring 44 thus varies the pressure in conduit 15 and therefore the master flows maintained in proportion by device 38 with corresponding adjustment of all of flows A, $F_1$, $F_2$ and $F_3$. Any means, automatic or manual, could be employed for varying the tension of spring 44. For simplicity, these means have been illustrated as comprising a rack 45 attached to the lower end of spring 44 and meshing with a manually operable gear 46 for vertical movement in fixed guides 47.

In Fig. 1a in which is illustrated a modification of that part of the master controller of Fig. 1 below the line a—a thereof, the ratio of the master flows is maintained by a device 38a responsive to the flow through conduit 14 and to the pressure in conduit 15 beyond the valve 42 and controlling the pressure in conduit 15 by adjustment of the leakage past a cup valve 48. In Fig. 1a simultaneous adjustment of all of the flows is effected by a device 39a which maintains the flow through conduit 14 in proportion to the tension of a spring 44a by adjustment of the valve 40 in conduit 14. As in Fig. 1 device 39a is illustrated as manually adjustable by means of a rack and gear.

In the modification illustrated in Fig. 1b the master flows are maintained in proportion by a device 38b responsive to the flows through conduits 14 and 15 and controlling valve 42 in conduit 15 upon variation in the ratio of the master flows. In Fig. 1b adjustment of all of the flows is effected by a device 39b, similar to device 39 in Fig. 1, but arranged to control the pressure in chamber 10 adjacent the connection of conduit 14 therewith; a throttle valve 40b, corresponding in function to valve 40 of Figs. 1 and 1a, being interposed between the point at which the pressure is controlled and the point of fluid admission to chamber 10.

It will be noted that Figs. 1 and 1a, insofar as the proportioning and adjusting devices of the master controller are concerned, differ only in that the flow proportioning device controls in Fig. 1a the pressure in conduit 15 instead of the flow in conduit 14 as in Fig. 1 and in that the adjusting device controls in Fig. 1a the flow in conduit 14 rather than the pressure in conduit 15. In each case the flow in conduit 14 and the pressure in conduit 15 are the functions controlled. The operation, therefore, as would be expected, is substantially similar. In each case, adjustment of any one of the component master flows from chamber 12 by adjustment of the valves controlling the corresponding pair of orifices results in a compensating variation in the other two component flows to maintain their sum constant and, therefore, in corresponding variations in the flows $F_1$, $F_2$ and $F_3$. Adjustment of the flow through orifices 20a and 20b varies the flow A without affecting flows $F_1$, $F_2$ and $F_3$ and thus varies the total ratio. Adjustment of the tension of spring 44 (or the corresponding spring 44a of Fig. 1a) varies all of the flows in unison without affecting the total ratio. In Fig. 1b, however, because the pressure, rather than the flow, of conduit 14 is controlled, adjustment of any one component flow from chamber 12 varies the flow controlled thereby, but does not alter the other two component flows nor the flows controlled thereby. Such an adjustment, however, reacts upon the control of flow A as it affects the total master flow through conduit 14 and, through it, the flow through conduit 15 and orifices 20a and 20b to vary the total ratio.

If, therefore, flows $F_1$, $F_2$ and $F_3$ were flows of different gaseous or liquid fuels to a furnace, and flow A the air for burning the same, the arrangement of Fig. 1 or the modification thereof of Fig. 1a, would be preferred if it was desired to adjust at the master the ratio between the various fuels without varying the total heat input, whereas the modification of Fig. 1b would be preferred if it was desired to adjust at the master one or another of the individual fuel supplies without compensating variation of the other fuels but with corresponding automatic variation in total air to compensate for the change in fuel.

In Fig. 1, pressure gauges 48 attached to each of the master loading lines 35, 30, 27 and 37 indicate the pressures intermediate the corresponding pairs of orifices and, therefore, give a measure of the flows controlled thereby. A gauge 49 connected to measure the pressure intermediate the orifices 19a and 19b serves as an indication of the total fuel flow for the pressure it measures varies directly with the pressure in conduit 15 as does the master flow through conduit 14 which controls the total fuel flow.

From the above description it will be apparent that the relation maintained by the apparatus of Fig. 1 may be expressed mathematically as follows:

$$\sqrt{P_A} = k_1\sqrt{P_{F_1}} + k_2\sqrt{P_{F_2}} + k_3\sqrt{P_{F_3}}$$

where $P_A$, $P_{F_1}$, $P_{F_2}$ and $P_{F_3}$ are the pressure differentials measuring the flows in conduit 1, 2, 3 and 4 respectively, and that, by suitable initial adjustment of balance arms of regulators 6, 7, 8 and 9 and of the valves at the master controlling the component flows, the constants $k_1$, $k_2$ and $k_3$ may be made equal or not as desired.

In Fig. 2 an application of the invention to the control of basic and make-up fuels and of the air therefor is illustrated.

In Fig. 2, the flow of basic fuel through a conduit 75 is controlled by a regulator 76 and, when the supply of the fuel is sufficient, is maintained in proportion to the flow of air through a conduit 77. A regulator 78 associated with a damper in conduit 77 controls the flow of air delivered to the conduit by a blower 79 and a regulator 80 associated with a damper in a conduit 81 controls the flow of make-up fuel through this conduit when the pressure of the basic fuel supply is insufficient to meet the demand; regulators 76, 78 and 80 being so controlled by the master controller now to be described as to maintain the total air flow equal to the air requirement for both fuels when both fuels are required or to the air requirement for the basic fuel when the supply thereof is sufficient.

The master controller like that of Fig. 1 comprises the chambers 12 and 13, the conduits 14 and 15, and supply pipe 11. As in the specific disclosure of Fig. 1 two pair of valve controlled orifices 19a, 19b and 20a, 20b permit the master fluid to flow from chamber 13 to atmosphere; the pressure intermediate orifices 20a and 20b measuring the component master flow therethrough controls the air flow regulator 78. The pressure intermediate orifices 19a and 19b measuring the component master flow therethrough controls a device 38c to maintain the master flow through conduit 14 in proportion to each of the component flows from chamber 13.

Component flows from chamber 12 through valve controlled orifices 82 and 83, unlike the corresponding component flows of Fig. 1 are automatically controlled by a balancing device 84 arranged to adjust throttle valves 85 and 86 controlling the component flows through orifices 82 and 83 respectively. The supply pressure of the basic fuel measured at a point in conduit 75 in advance of the damper controlled by regulator 76 is transmitted by a pipe 87 to a diaphragm closed chamber 88 of device 84 and balances thereupon the pressure intermediate throttle valve 86 and orifice 83 as transmitted to a diaphragm closed chamber 89 of device 84. A pivoted lever 90 is so connected with device 84 and with throttle valves 85 and 86 as to adjust these valves oppositely upon departure of device 84 from balance. Regulators 76 and 80 are controlled by pressures measuring the component flows through orifices 82 and 83 respectively and transmitted to the regulators by pipes 91 and 92.

In operation of the apparatus of Fig. 2, device 84 and parts associated therewith are so adjusted as to insure that valve 85 will be closed and valve 86 open when the pressure in chamber 88 exceeds that necessary for balance. Under these conditions regulator 80, receiving no control pressure through pipe 91, will operate to cut-off the flow of make-up fuel by closure of the damper in conduit 81, and as the component flow through orifices 83 equals that through conduit 14 the pressure in pipe 92 will operate to cause regulator 76 to maintain the flow of basic fuel in proportion to the air flow, as this latter flow is controlled by the flow through orifices 20a and 20b which is proportional to the master flow through conduit 14. If now, for any reason, the supply pressure of the basic fuel fails, the reduction in the pressure in chamber 88 reacts upon device 84 to adjust valves 85 and 86 until the reduction in the component flow through orifice 83 is sufficient to bring the pressure in chamber 89 to a value that will balance that in chamber 88. In this manner, the controlling flow through orifice 83 is reduced sufficiently to insure that regulator 76 will not call for a greater flow of basic fuel than can be delivered at the time and the component flow through orifice 82 is such that regulator 80, responsive to this component flow, adjusts the flow of make-up fuel to compensate for the reduction in the flow of basic fuel. As the sum of the component flows from chamber 12 must always necessarily be equal to the master flow through conduit 14 and as this master flow is maintained in proportion to the component flow controlling the air flow through conduit 77, it follows that the air flow will always be properly proportioned to the sum of the two fuel flows so long as regulator 76 is kept in range. Device 84 by its response to the control pressure for regulator 76 and to the basic fuel supply pressure insures that regulator 76 does not call for a greater basic fuel flow than can be supplied at the existing fuel supply pressure.

After a reduction of supply pressure of the basic fuel, as above described, if the pressure should then increase, device 84 operates to increase the pressure in chamber 89 by adjustment of valves 85 and 86, either to completely shut off the flow of make-up fuel, should it be no longer required, or to reduce it to the minimum value required under the new supply pressure conditions.

The total heat input is controlled by a device 39c. The fuel-air ratio may be varied by adjustment of either component flow from chamber 13. Device 39c is illustrated as being controlled in response to changes in the pressure in a chamber 70, which might for example be the pressure of the steam generated in a boiler heated by the fuel delivered by conduits 75 and 81. The movable diaphragm 71 of chamber 70 is connected to a cross arm 72 and to the balance 39c. Heavy springs 73, connected to the cross arm 72 and to a fixed cross arm 74 carrying the casing of chamber 70, exert a force upon lever 39c in opposition to that exerted by the steam pressure and together therewith insure a pressure in conduit 15 varying with the departure of the steam pressure from a predetermined valve.

The arrangement is such that when the pressure in chamber 70 decreases, indicating an increase in boiler load, device 39c operates to increase the pressure in conduit 15 and therefore to increase proportionately the component flows through orifices 19a, 19b, and 20a, 20b. The increase in flow through orifices 19a, 19b through device 38c operates to proportionately increase the master flow through conduit 14 and the increase in flow through orifices 20a, 20b operates to correspondingly increase the total air flow through conduit 77. The increase in flow through conduit 14 proportionately increases the component flows from chamber 12, causing operation of regulators 76 and 80 to proportionately increase the total fuel supply.

If the supply pressure of the basic fuel is insufficient to supply the increased fuel flow required by the increased flow through orifice 83, device 84 operates as above described to open valve 85 and close valve 86 until the new fuel requirements are met. Conversely, an increase in pressure in chamber 70 reduces the fuel and air flows, and, if the basic fuel pressure is adequate, reduces or cuts off the flow of make-up fuel through conduit 81. Instead of the device 39c, manual adjustment of the total heat input as in Fig. 1 could be employed if desired.

In Fig. 3 an embodiment of the invention particularly adapted to the control of a return oil burner system is illustrated; the arrangement being such that the flow of air is proportioned to the difference between the oil flow to the burner and the oil flow from the burner, each flow being accurately measured and controlled. The burner 93 receives oil from a conduit 94 through which the oil flows in the direction of the arrow and receives air for burning the oil from a conduit 95. Dampers 96 and 96a controlled respectively by regulators 97 and 98 control the inlet and outlet oil flows respectively and a damper 99 controlled by a regulator 100 controls the flow of air to the burner. Regulators 97, 98 and 100 operate in response to controlling pressures transmitted through pipes 101, 102 and 103 respectively from the master controller 104. Master controller 104 comprises the chamber 105 to which master fluid is delivered from the supply pipe 106 and pressure chambers 107, 108 and 109 connected with chamber 105 by means of conduits 110, 111 and 112 respectively. The pressures in conduits 110 and 112 beyond the throttling valves 113 and 114 therein are controlled by devices 115 and 116 respectively, each shown similar to device 39 of Fig. 1. From each of chambers 108 and 109 master fluid flows to the atmosphere through two pair of valve controlled orifices and from chamber 107 master fluid flows through one pair of valve controlled orifices. One component flow from chamber 109 controls regulator 97 through pipe 101 connected to transmit pressure measuring this component flow, and the other component flow from this chamber controls the flow through conduit 111 by means of device 117 similar to device 38c of Fig. 2. The two component flows from chamber 108 control regulators 98 and 100 through pipes 103 and 102 respectively transmitting pressures measuring the component flows. The component flow from chamber 107 controls the division of the master flow through conduit 111 by means of a device 118 similar to device 84 of Fig. 2 and responsive to the pressure measuring the flow from chamber 107 and to the pressure in pipe 102 measuring one component flow from chamber 108. Device 118, like device 84 of Fig. 2, varies the ratio between the component flows from chamber 108 by opposite adjustment of throttle valves 119 and 120 controlling these component flows; the sum of these flows being unaffected by device 118.

From the description already given in connection with the earlier figures it will be apparent that the master controller of Fig. 3 will maintain the total inlet oil supply in proportion to the sum of the air flow and the outlet oil flow. It follows, therefore that the air flow will be maintained in proportion to the difference between the inlet and outlet oil flows, that is, in proportion to the oil consumed by the burner. Inasmuch as device 115 controls, through device 118, the relation between the pressures in pipes 102 and 103 and therefore the air flow and the outlet oil flow, it serves as a means for adjusting the total heat input to the burner without disturbing the fuel air ratio. Device 116 serves for initial adjustment of the apparatus and to insure a constant, but adjustable, inlet flow of oil. Adjustment of the valves controlling either component flow from chamber 109 serves to vary the fuel-air ratio either by varying the inlet oil flow independently of the air and outlet oil flows or by varying the latter two flows while maintaining the inlet oil flow constant.

It will be apparent that devices 115 and 118, and consequently that part of the master including conduit 110 and chamber 107, while of value in increasing the flexibility of the system are not essential to the regulation as valves 119 and 120 could be manually adjusted when variation in the total heat, independent of the inlet oil flow, was desired. When these parts are omitted the portion of the master controller remaining differs in only minor details from that of Fig. 1 the differences being that the master of Fig. 1 has three component flows from chamber 12 while there are but two component flows from corresponding chamber 108 of the master of Fig. 3 and the flow through conduit 14 of Fig. 1 is controlled by the pressure in conduit 14 in the master of Fig. 1 while the corresponding flow in Fig. 3 is controlled by one of the component flows from chamber 109, to effect equivalent results with more flexibility of adjustment.

Expressed mathematically the relation maintained by the apparatus of Fig. 4 is $$\sqrt{P_A} = k_1\sqrt{P_I} - k_2\sqrt{P_o}$$

where $P_A$, $P_I$ and $P_o$ represent the pressure differentials measuring the air flow, inlet oil flow and outlet oil flow respectively.

Where fuel and air to several furnaces are to be controlled, a separate master controller of the type of that described in connection with Fig. 1 could be employed for each furnace, or, if desired, but one master need be employed, similar to that of Fig. 1 but with each control pipe 27, 30, 35 and 37 branching to a regulator at each furnace. Such an arrangement, however, would not permit of independent adjustment of the separate furnaces at the master.

Where means are desired to permit of such independent adjustment of the furnaces a master controller such as is illustrated in Fig. 4 may be employed. The master of Fig. 4 is specifically shown as controlling the feed of fuel and the primary and secondary air flows to two furnaces to maintain the total heat input to the furnaces in proportion and to maintain at each furnace the desired ratio between the fuel flow and the two air flows. The two furnaces are indicated diagrammatically at 121a and 121b. Powdered fuel is fed to each furnace from hoppers 122a and 122b by feeders 123a and 123b delivering fuel to conduits 124a and 124b where it meets the primary air and is carried thereby to burners 125a and 125b. Secondary air is delivered to the furnaces adjacent the burners 125a and 125b by conduits 126a and 126b. The flow of fuel to the furnaces is controlled by regulators 127a and 127b, the primary air flows by regulators 128a and 128b and the secondary air flows by regulators 129a and 129b. As indicated diagrammatically, regulator 127a is responsive to a force varying with the square of the speed of feeder 123a shown specifically as the force exerted by a fly-ball device measuring the feeder speed, and to a control pressure in pipe 130a. The regulator operates, upon departure from balance between these forces, to vary a resistance in the circuit of the feeder motor to bring the speed of the feeder to the desired value. As the fuel flow to the burner varies directly as the speed of the feeder, the control by regulator 127a is equivalent to a flow control. Similarly regulator 127b controls the speed of feeder 123b to maintain the square of the speed thereof in proportion to the control pressure in pipe 130b.

The flows of primary and secondary air are controlled by regulators 128a, 128b and 129a, 129b by adjustment of dampers in the respective conduits associated therewith in response to the flow through the respective conduits and to controlling pressures transmitted through pipes 131a, 131b and 132a, 132b respectively.

The master controller of Fig. 4 comprises the chambers 133, 134a and 134b to which master fluid is delivered through conduits 135, 136a and 136b respectively from chamber 137 connected with the supply pipe 138.

Associated with chamber 133 are means for creating four component masters flows to the atmosphere. Pressures varying with two of these component flows are transmitted through pipes 130a and 130b to regulators 127a and 127b and pressures varying with the other two component flows are transmitted to devices 139a and 139b, corresponding to devices 38c of Fig. 2, for the control of the respective master flows through conduits 136a and 136b. Two component flows from each of chambers 134a and 134b control the primary and secondary air flow regulators by transmission of controlling pressures through pipes 131a, 132a and 131b, 132b.

Adjustment of the total heat input in both furnaces may be effected by a device 140, similar to device 39 of Fig. 1, and controlling the pressure in conduit 135. Adjustment of the fuel-air ratio for either furnace independently of the other furnace may be effected by adjustment of the component flows controlling the fuel feed for that furnace or by adjustment of the component flow controlling device 139a, for furnace 121a or of the component flow controlling device 139b for furnace 121b. Adjustment of the total heat input to furnace 121a may be effected by adjustment of the component flow controlling regulator 127a and of the component flow controlling device 139a. The primary secondary air ratio of either furnace may be effected by adjustment of the component flows from chambers 134a or 134b.

It will be noted that the master of Fig. 4 maintains two air flows in proportion to one fuel flow, two other air flows in proportion to another fuel flow, and the two fuel flows in proportion. It follows therefore, that this master also maintains the sum of the two air flows in proportion to the sum of the two other air flows. This master is thus suitable for use wherever the sum of several flows are to be proportioned to the sum of several other flows and it is desired to be able to independently adjust the sum of either of the several flows. The master controller of Fig. 1 could also be used for this purpose but it would not permit of such ready adjustment of the sums of the several flows.

I have now described various control systems and master controllers embodying my invention and adapted to carry out my novel method of regulating a plurality of quantities. The drawings illustrate the principles of the apparatus but are of course to a great extent, diagrammatic. This is particularly true of the various flow regulators and balancing devices which in each case have been indicated as directly controlling, by linkage, an associated damper or valve. These regulators have not been illustrated more specifically as they form no part of the invention and are now well known. Ordinarily such regulators would be of the antihunting type employing auxiliary fluid operating on power cylinders for adjusting the controlled damper or valves. Examples of balanced regulators suitable for use with my improved master controller to carry out the method of the invention may be found in the reissue patent to Charles H. Smoot, Number 16,507 dated December 21, 1926.

In each of the drawings, except Fig. 2, the master has been illustrated as being manually adjustable. Obviously automatic adjustment in response to a varying force could as well be employed in any case where desired.

Also, in each of the drawings except Fig. 4, the individual regulators have all been illustrated as directly controlling fluid flows. Obviously the invention is equally applicable whether the function controlled is the flow of fluid or whether it is the speed of a motor, or the heating effected by an electric current, etc., each of which, broadly speaking, is measurable by forces varying as the square thereof and may be considered, therefore, as quantities of the flow type.

By reference to the drawings it will be noted that the control in each case comprises the creation of a plurality of master fluid flows, the division of at least one of these flows into a plurality of component flows, the proportioning of the master flows to each other, either directly or indirectly, and the control of other flows by forces varying with the component flows of one master flow and with the component flow or flows of the other master flow to obtain desired relations between the controlled flows. By such control, sums or differences of two flows have been proportioned to other flows, and maximum adjustability of the flows at the master is made possible. The invention has been described in connection with the control of several fuels and one air supply therefor, with the control of basic and make-up fuel supplies, with the control of return oil burner systems and with the control of primary and secondary air flows for a single fuel. Many other applications of the basic idea could be described but it is believed that the above has been sufficient to show the wide applicability of the invention to the solution of regulating problems.

This application is a continuation in part of my application, Serial No. 511,954 filed January 29, 1931.

I claim:

1. The method of regulating a plurality of quantities of the flow type which comprises creating a master flow of an auxiliary fluid, controlling the volume of the master flow by maintaining a predetermined pressure differential across a fixed resistance in the path thereof, dividing the master flow into a plurality of component flows, deriving a control force from each of the component flows and regulating the quantities by said control forces.

2. The method of maintaining one pressure in proportion to the square of the sum of linear functions of the square roots of a plurality of other pressures which comprises creating a master fluid flow, controlling the volume thereof, subdividing the master flow into a plurality of component flows, then maintaining the one pressure in proportion to a pressure varying as the square of the master flow and maintaining each of said other pressures in proportion to a pressure varying with one of the component flows.

3. The method of regulating a single flow quantity in proportion to the sum of a plurality of other flow quantities which comprises creating two proportionate control flows, dividing one of said control flows into a plurality of components equal in number to the plurality of flow quantities and controlling the single flow quantity by a force varying with the undivided control flow and each of the plurality of flow quantities by a force varying with one of the components of the divided control flow.

4. The method of regulating a furnace supplied with a single air supply and a plurality of fuel supplies which comprises creating an auxiliary fluid flow, controlling the volume thereof and subdividing the same into a plurality of component flows, and maintaining the flow of air to the furnace in proportion to the undivided fluid flow and the flow of each fuel to the furnace in proportion to one of the component flows.

5. A step in the method of claim 4 which comprises adjusting the relation between component flows in response to variations in the supply pressure of one of the fuels to compensate for deficiencies in the supply thereof without effecting the ratio of the air to the sum of the fuels supplied.

6. The method of regulating the supply of fuel and the flows of primary and secondary air to a furnace which comprises creating an auxiliary fluid flow, controlling the volume thereof, subdividing the same into a plurality of component flows and maintaining the supply of fuel to the furnace in proportion to the total flow and the flows of primary and secondary air each in proportion to one of the component flows.

7. The method of regulating a return oil burner system which comprises creating an auxiliary fluid flow, controlling the volume thereof, subdividing the same into a plurality of component flows and maintaining the flow of fuel to the burner system in proportion to the total fluid flow and the flow of air and the flow of fuel from the burner system each in proportion to one of the component flows to maintain the air flow in proportion to the difference between the oil supplied to and that withdrawn from the burner system.

8. A master controller for creating a plurality of control pressures a linear function of whose square roots is in proportion to the square root of another created control pressure which includes a chamber, means for supplying fluid thereto at a controllable rate, said chamber being provided with a plurality of controllable vents for the fluid, whereby pressures measuring the flows through said vents bear the stated relation to a pressure varying as the flow to said chamber.

9. A master controller for regulating a plurality of flow quantities for maintaining their sum proportional to another flow quantity which includes means for creating two master flows of an auxiliary fluid, means for subdividing one of said flows into a plurality of components, a device responsive to forces varying with said two flows for maintaining the same in proportion, means for creating a control pressure varying as the square of said master flows and for creating a plurality of control pressure each varying as the square of one of said component flows whereby the stated relation between the flow quantities may be maintained by regulation responsive to said control forces.

10. A master controller comprising two chambers each provided with a plurality of valve controlled vents, a supply pipe for said master, a conduit connecting said supply pipe with one of said chambers, a second conduit connecting said supply pipe with the other of said conduits, a throttle valve in each of said conduits, a device responsive to the flow through each conduit adapted to adjust one of said valves to maintain the flow through the conduit associated therewith in proportion to the flow through the other conduit and means responsive to a controlling force for automatically controlling the flow through the latter conduit.

11. A master controller comprising in combination means for creating two fluid flows and for subdividing at least one of said flows into a plurality of component flows, a device responsive to pressures varying with said two flows adapted to maintain the same in proportion, means associated with the component flows adapted to vary the relation therebetween without disturbing the ratio maintained by said device, and means responsive to a controlling force for varying said two flows together.

12. A master controller according to claim 11 including means for adjusting one of the pressures acting upon said device to vary the ratio controlled thereby.

13. In combination with a furnace supplied with fuel and primary and secondary air for burning the same, a regulating system therefor including a regulator for the fuel and regulators for each air supply, a master controller comprising two chambers each having a plurality of valve controlled vents, means for supplying proportionate volumes of master fluid to said chambers, a pipe connected to one of said chambers adjacent one of the vents therein for transmitting a controlling pressure to said fuel regulator varying with the square of the flow through the associated vent and pipes adjacent to two of the vents of said other chamber for delivering to said air regulators control pressures each varying with the square of the component flow through the associated vent.

14. In combination with a furnace supplied with two fuels and air for burning the same, a regulating system therefor including a regulator for the air supply and regulators for each fuel supply, a master controller comprising two chambers, means for supplying proportionate volumes of master fluid to said chambers, a plurality of outlet pipes connected to each chamber for leakage of fluid therefrom, a pair of valves in each outlet pipe, a pipe connected intermediate the valves in one of the outlet pipes of one chamber for transmitting controlling pressure to said air regulator and pipes intermediate the valves in two of the outlet pipes of the other chamber for transmitting control pressures to said fuel regulators.

15. The combination according to claim 12 including a device response to a function of the supply of one of said fuels and to the flow through the outlet pipe associated with the control of the regulator for that fuel arranged for opposite control of one of each of the valves in the outlet pipes associated with the control of the fuel regulators whereby one fuel is so controlled as to make up a deficiency in the other fuel while their sum is maintained in proportion to the air supply.

16. In combination with a return oil burner system having fuel inlet and outlet conduits and an air delivery conduit of a regulating system including a regulator for each conduit responsive to the flow therethrough and to a control force and a master controller for said regulators, said controller comprising two chambers supplied with proportionate flows of fluid and each provided with a plurality of valve controlled vents, said master further including means for transmitting as the control force to the regulator for the oil inlet conduit a pressure measuring the flow of fluid through one of the vents of one chamber and as the controlling pressures to the other two regulators pressures measuring two of the flows of fluid through vents of the other chamber whereby the flow of air to the burner system is proportioned to the difference between the oil supplied and that withdrawn therefrom.

17. The method of regulating a furnace burning a plurality of fuels, wherein one is basic and the others make-up fuels which includes supplying air for combustion in a single flow, maintaining a predetermined ratio between said flows of said fuels and said air flow, while increasing and decreasing said make-up flow upon decrease or increase respectively in said basic flow.

In testimony whereof, I have signed my name to this specification.

GEORGE K. O'CONNOR.